United States Patent
Hwang et al.

(10) Patent No.: US 11,696,286 B2
(45) Date of Patent: Jul. 4, 2023

(54) METHOD AND DEVICE FOR MANAGING CONTROL INFORMATION IN NR V2X

(71) Applicant: LG ELECTRONICS INC., Seoul (KR)

(72) Inventors: Daesung Hwang, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/556,653

(22) Filed: Dec. 20, 2021

(65) Prior Publication Data

US 2022/0116974 A1  Apr. 14, 2022

Related U.S. Application Data

(63) Continuation of application No. PCT/KR2020/008074, filed on Jun. 22, 2020.

(30) Foreign Application Priority Data

Jun. 21, 2019 (KR) .................. 10-2019-0074529
Jan. 22, 2020 (KR) .................. 10-2020-0008706

(51) Int. Cl.
*H04L 1/1812* (2023.01)
*H04W 72/20* (2023.01)

(52) U.S. Cl.
CPC .......... *H04W 72/20* (2023.01); *H04L 1/1812* (2013.01)

(58) Field of Classification Search
CPC ......... H04W 72/1278; H04W 72/0413; H04W 4/46; H04W 72/0406; H04W 4/40; H04W 4/023; H04W 72/1242; H04L 1/1812; H04L 5/0055; H04L 1/1861; H04L 5/0048; H04L 5/001; H04L 1/0073; H04L 1/0026; H04L 1/1854; H04L 1/1896; H04L 1/00; H04L 5/044; H04L 1/0028; H04L 1/0006; H04L 1/001; H04L 1/003; H04L 1/004;

(Continued)

(56) References Cited

U.S. PATENT DOCUMENTS 9,794,976 B2 * 10/2017 Sartori .............. H04W 72/0406
10,985,879 B2 * 4/2021 Wu .................... H04W 72/0406
11,006,395 B2 * 5/2021 Gulati ................... H04L 5/0094

(Continued)

OTHER PUBLICATIONS

LG Electronics, Discussion on physical layer structure for NR sidelink, R1-1907012, 3GPP TSG RAN WG1 #97, Reno, USA, May 3, 2019, see sections 2.1.1 and 2.1.2.1; and figure 4.

(Continued)

*Primary Examiner* — Hanh N Nguyen
(74) *Attorney, Agent, or Firm* — Dentons US LLP

(57) ABSTRACT

A method for performing wireless communication by a first device and a device for supporting same are provided. The method may include receiving, from a second device, a physical sidelink control channel (PSCCH) including a first sidelink control information (SCI) for scheduling a physical sidelink shared channel (PSSCH); receiving, from the second device, the PSSCH including a second SCI; and transmitting, to the second device, a hybrid automatic repeat request (HARQ) feedback through a physical sidelink feedback channel (PSFCH) in response to the PSSCH based on a format of the second SCI.

12 Claims, 22 Drawing Sheets

(58) Field of Classification Search
CPC ... H04L 1/1864; H04L 5/0044; H04L 5/0053; H04L 1/10006; H04L 1/01
See application file for complete search history.

(56) References Cited

U.S. PATENT DOCUMENTS

| | | | |
|---|---|---|---|
| 11,470,452 B2* | 10/2022 | Ganesan | H04B 7/0617 |
| 2020/0099476 A1* | 3/2020 | Park | H04W 4/70 |
| 2020/0228247 A1* | 7/2020 | Guo | H04W 4/46 |
| 2020/0314822 A1* | 10/2020 | Lee | H04L 5/0091 |
| 2020/0336253 A1* | 10/2020 | He | H04L 5/0055 |
| 2021/0243554 A1* | 8/2021 | Wu | H04W 4/023 |
| 2022/0311583 A1* | 9/2022 | Ye | H04L 1/1861 |

OTHER PUBLICATIONS

Sharp, Physical layer structure for NR sidelink, R1-1907216, 3GPP TSG RAN WG1 #97, Reno, USA, May 3, 2019, see section 2.2.
Sequans Communications, On HARQ procedure for NR sidelink, R1-1905388, 3GPP TSG RAN WG1 Meeting #96bis, Xian, China, Apr. 3, 2019, see section 2.1.
Zte et al., Discussion on working scope of V2X, RP-190216, 3GPP TSG Ran Meeting #83, Shenzhen, China, Mar. 11, 2019, see section 3.

* cited by examiner (a)

(b)

(a)

(b)

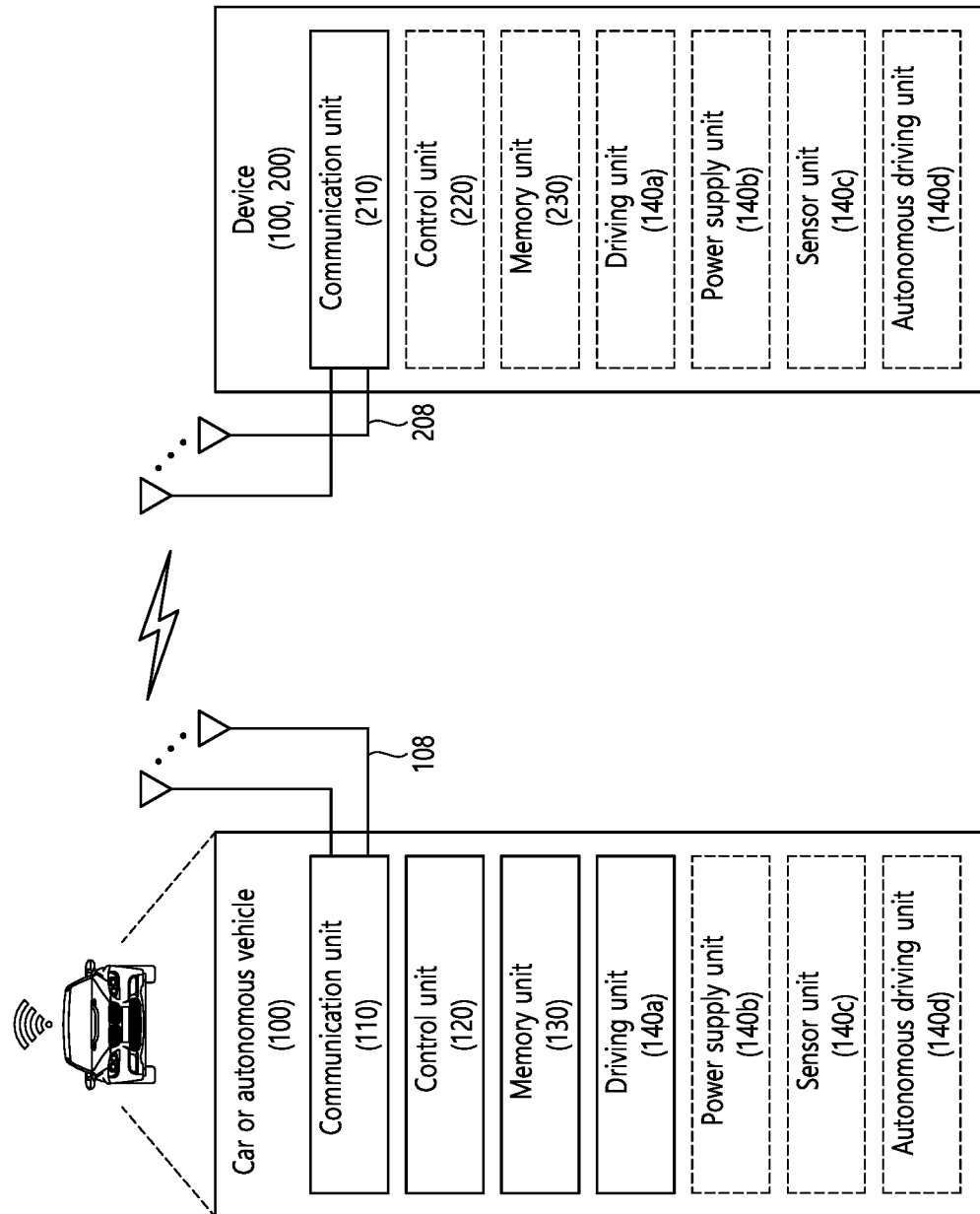

METHOD AND DEVICE FOR MANAGING CONTROL INFORMATION IN NR V2X

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in a wireless communication system, a downlink control information (DCI) format size may be limited in order to reduce the complexity of a UE (especially, for example, the number of circuits or logic for decoding control information, etc.). More specifically, for example, in the Uu link, the total number of DCI format sizes expected by the UE in a semi-static manner may be four, and at the same time, the number of DCI format sizes scrambled with Cell Radio Network Temporary Identifier (C-RNTI) may be three. The above-described restriction on the number of DCI format sizes may be referred to as a DCI format size budget. In order to satisfy the DCI format size budget, the UE may perform size matching to achieve a specific size with respect to some DCI format sizes. More specifically, for example, when the DCI format budget is not satisfied, size matching may be performed to match the size of DCI format 1_0/0_0 in UE-specific search space (USS) to the size of DCI format 1_0/0_0 in common search space (CSS). For example, when the DCI format budget is not satisfied, the UE may perform size matching so that the size of DCI format 1_0/0_0 in USS is the same as the size of DCI format 1_0/0_0 in CSS.

Meanwhile, in terms of the complexity of the UE, equally or similarly, it may be necessary to limit a size of a sidelink control information (SCI) format for sidelink control information. For example, the UE may need to perform size matching with respect to the SCI format size.

Technical Solutions

According to an embodiment of the present disclosure, there is provided a method of performing wireless communication by a first device. The method may include receiving, from a second device, a physical sidelink control channel (PSCCH) including a first sidelink control information (SCI) for scheduling a physical sidelink shared channel (PSSCH); receiving, from the second device, the PSSCH including a second SCI; and transmitting, to the second device, a hybrid automatic repeat request (HARQ) feedback through a physical sidelink feedback channel (PSFCH) in response to the PSSCH based on a format of the second SCI.

Effects of the Disclosure

A UE may effectively perform sidelink communication.

BRIEF DESCRIPTION OF THE DRAWINGS

FIG. 22 shows a car or an autonomous vehicle, in accordance with an embodiment of the present disclosure.

DESCRIPTION OF EXEMPLARY EMBODIMENTS

Figure 1:
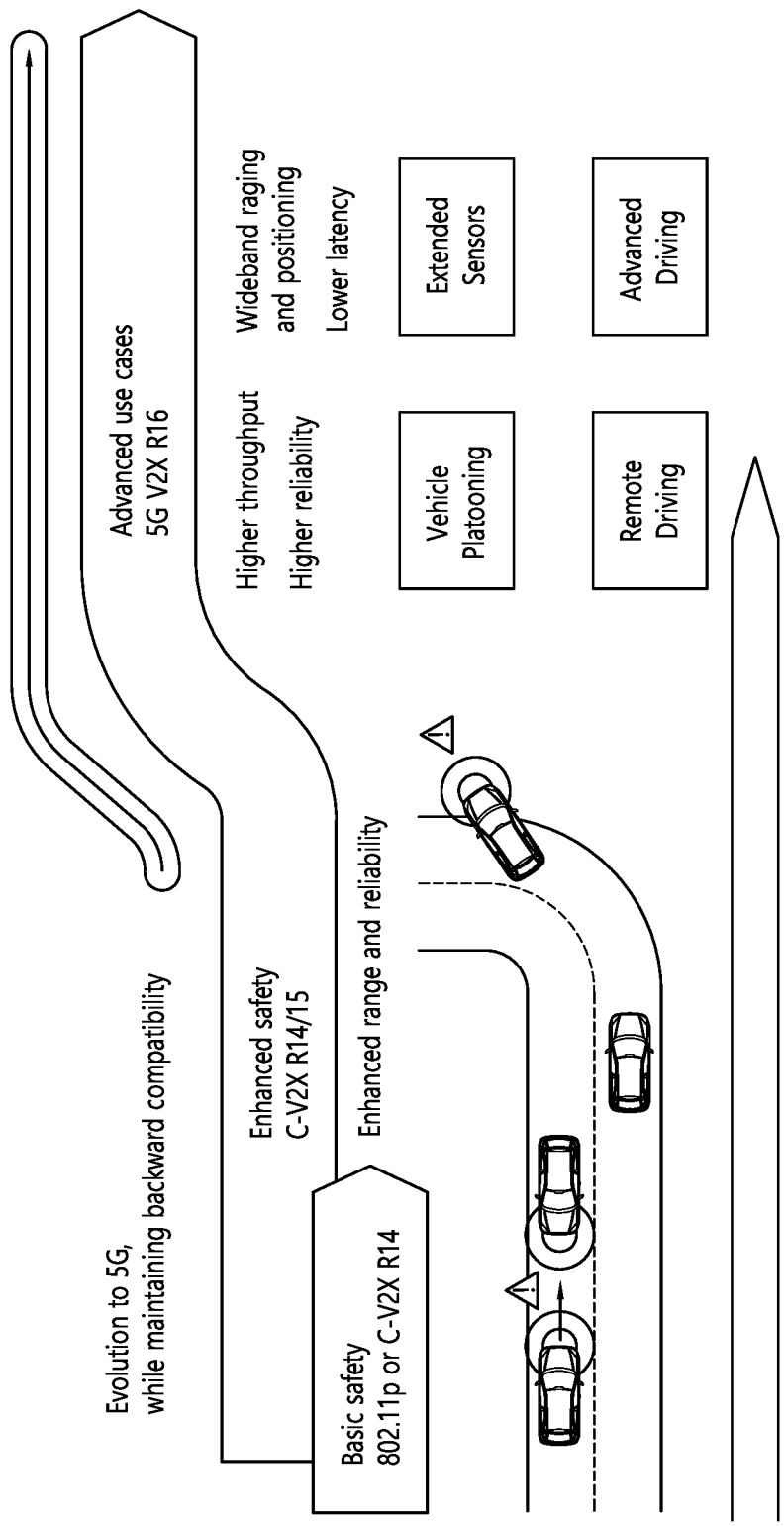
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
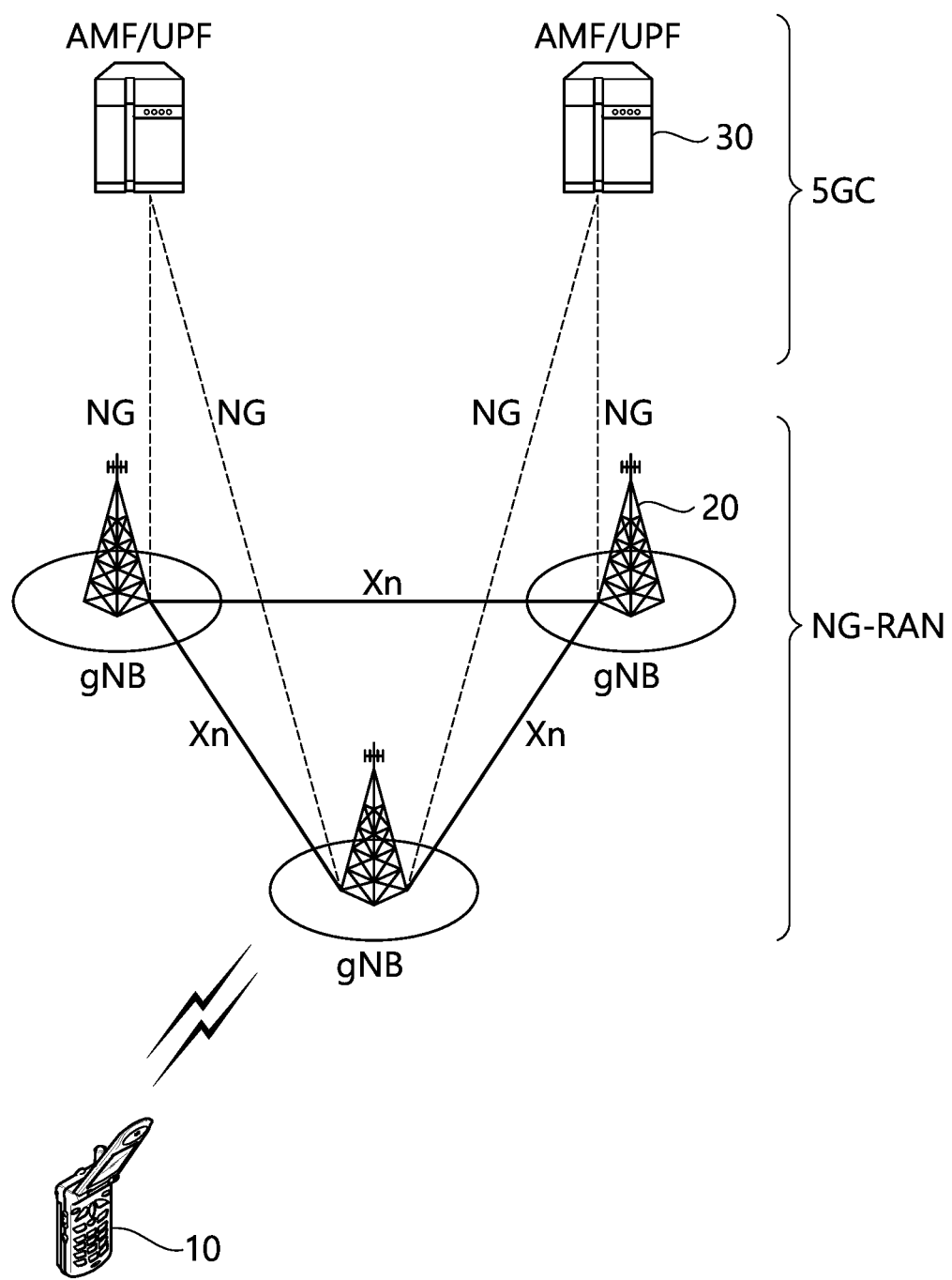
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
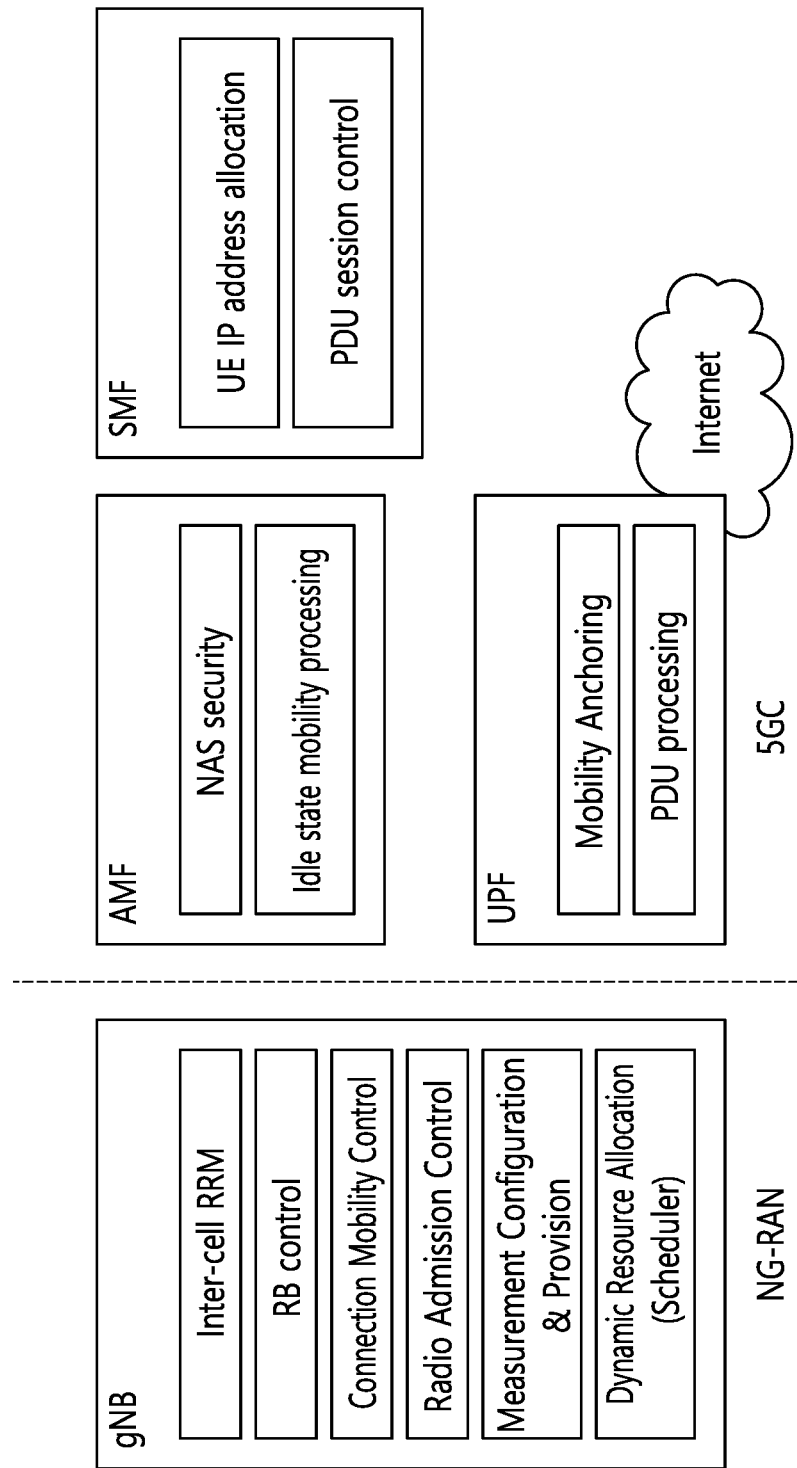
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
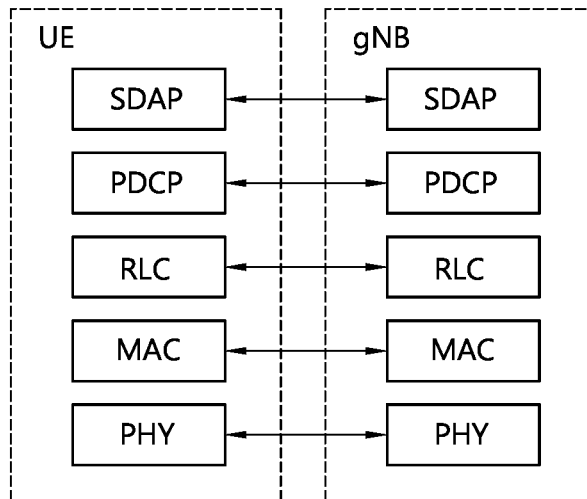
FIG. 4 shows a radio protocol architecture, in accordance with an embodiment of the present disclosure.
Figure 4:
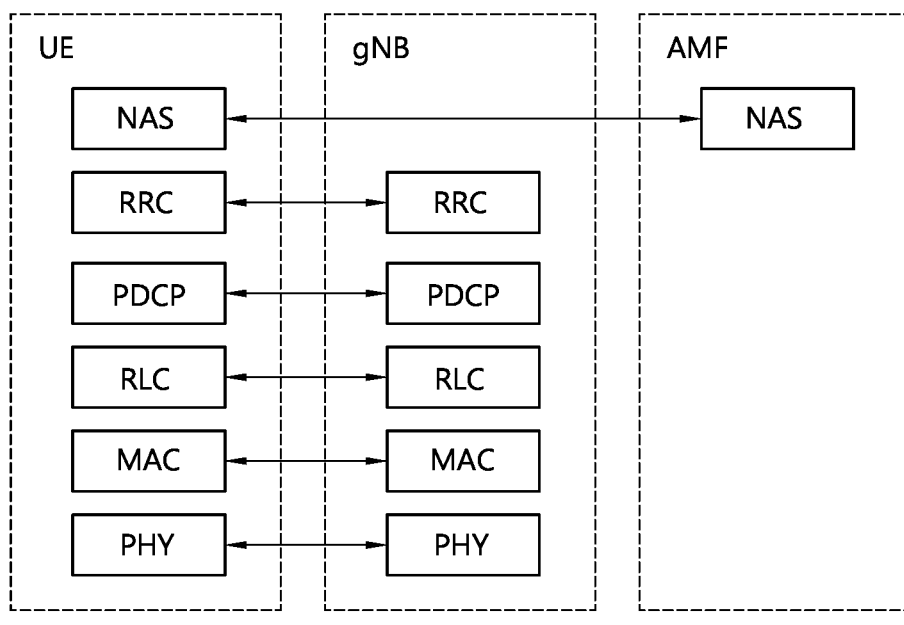

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
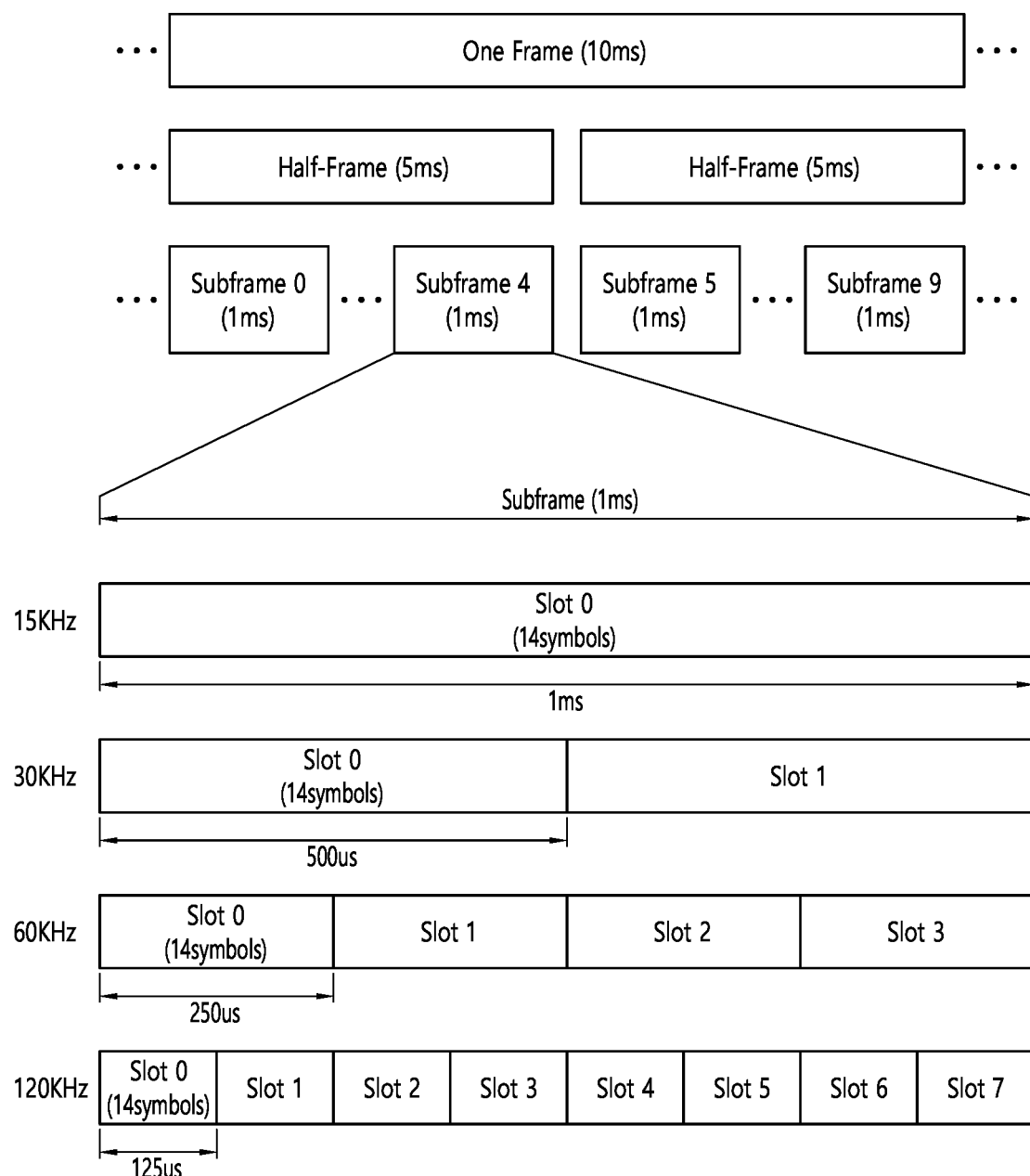
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,\mu}_{slot}$), and a number of slots per subframe ($N^{subframe,\mu}_{slot}$) based on an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, an so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
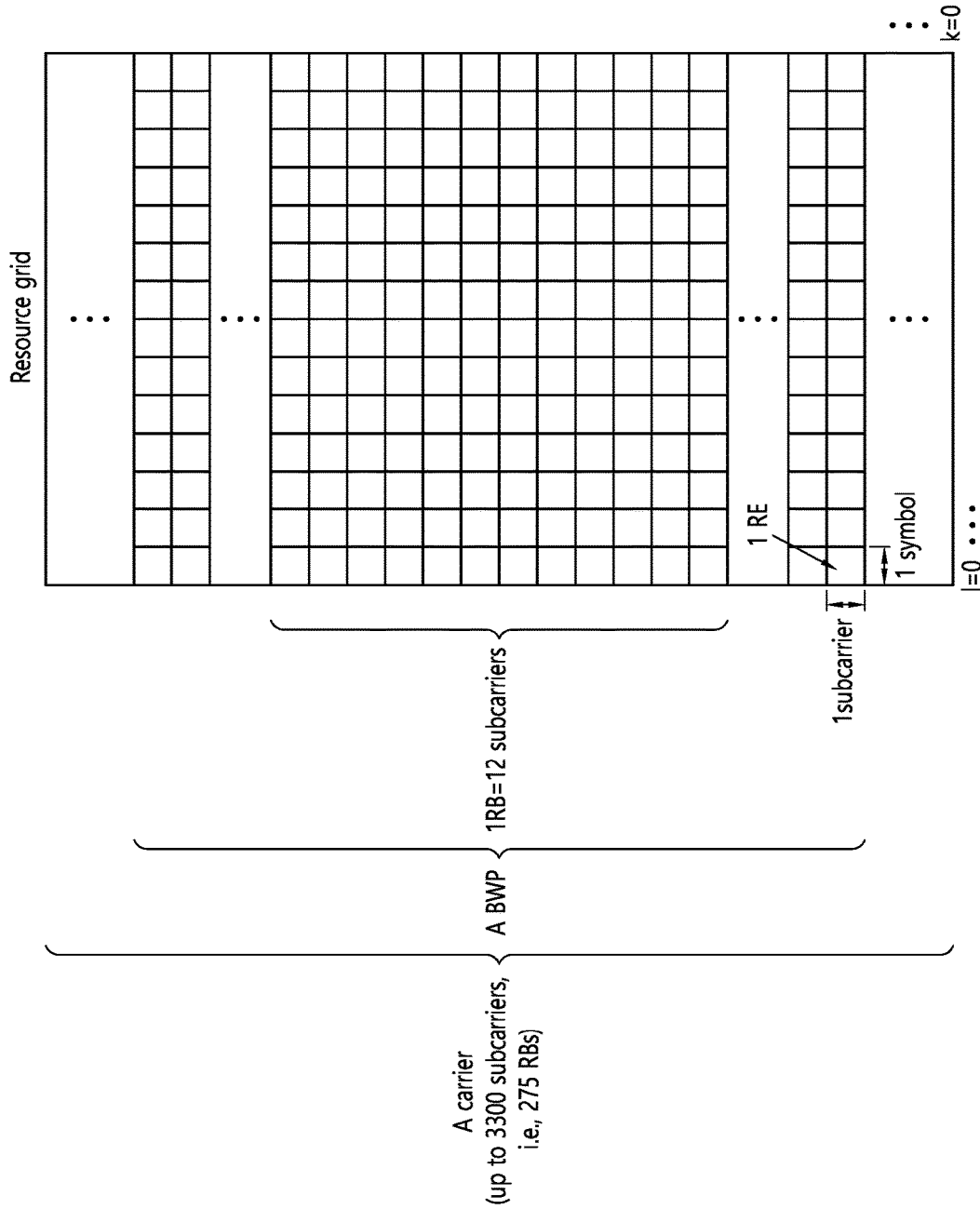
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
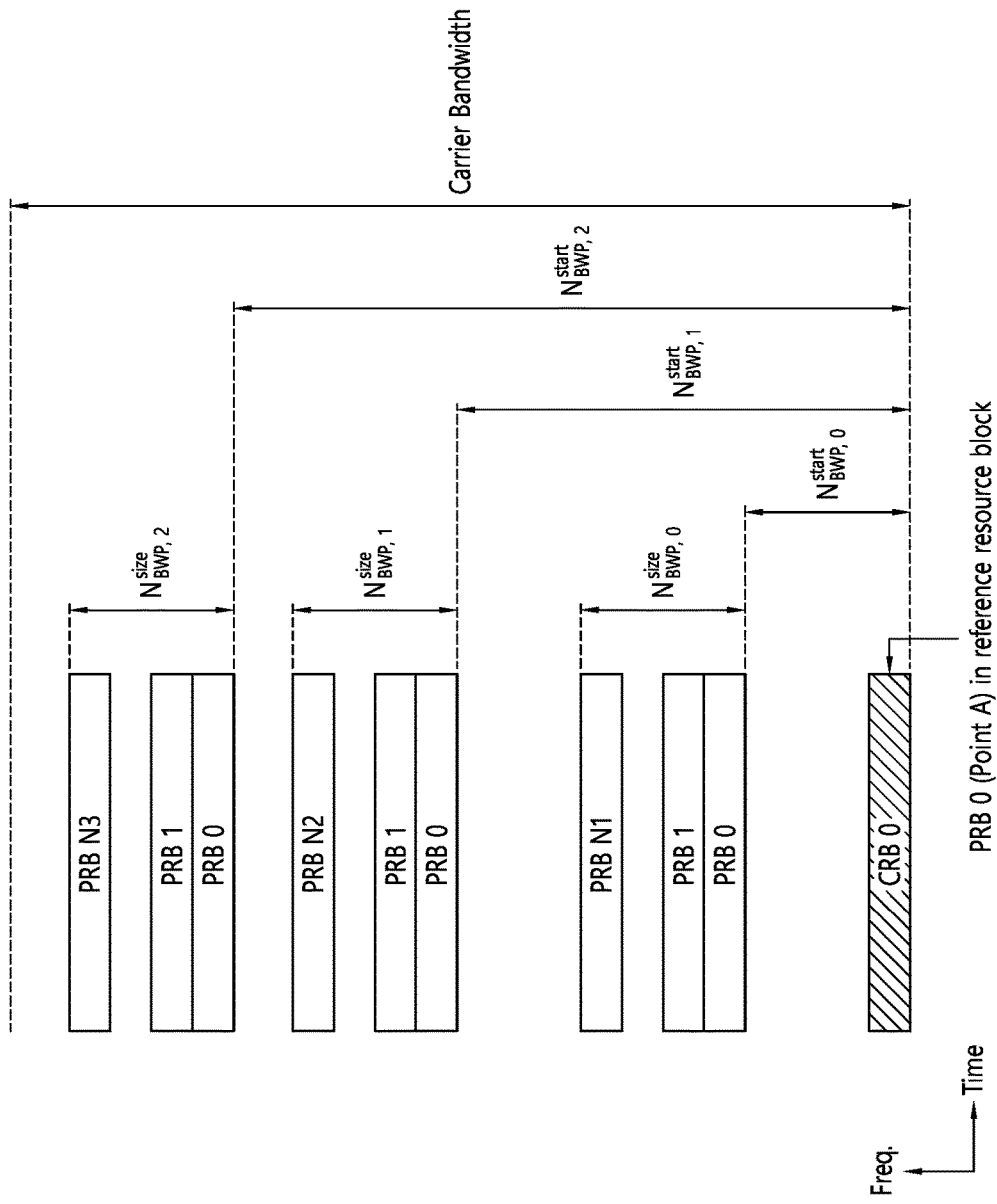
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
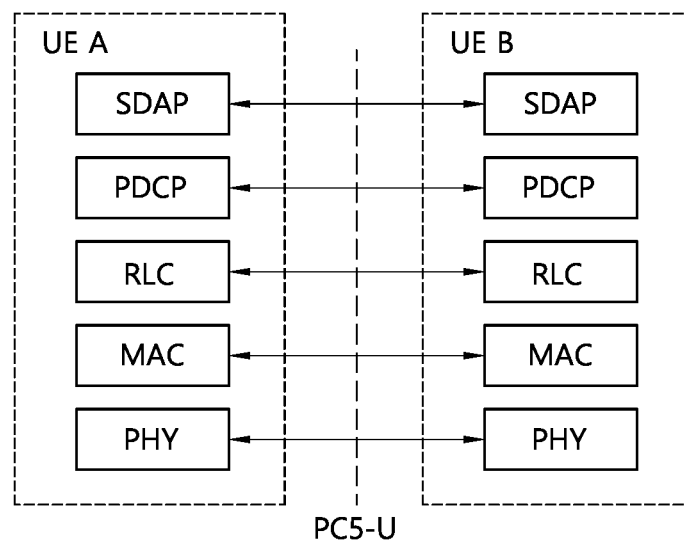
FIG. 8 shows a radio protocol architecture for a SL communication, in accordance with an embodiment of the present disclosure.
Figure 8:
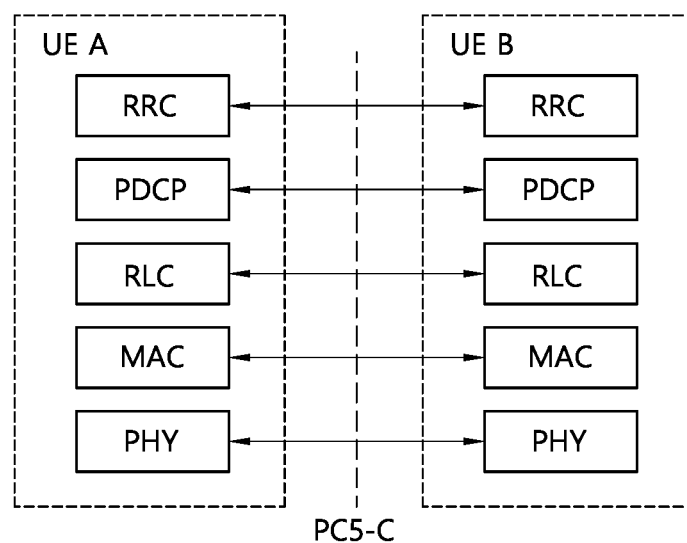

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
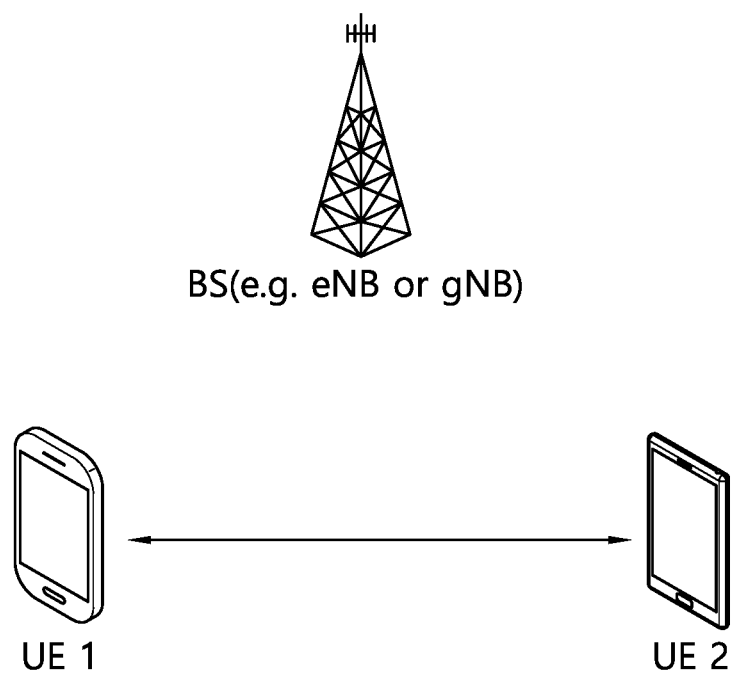
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
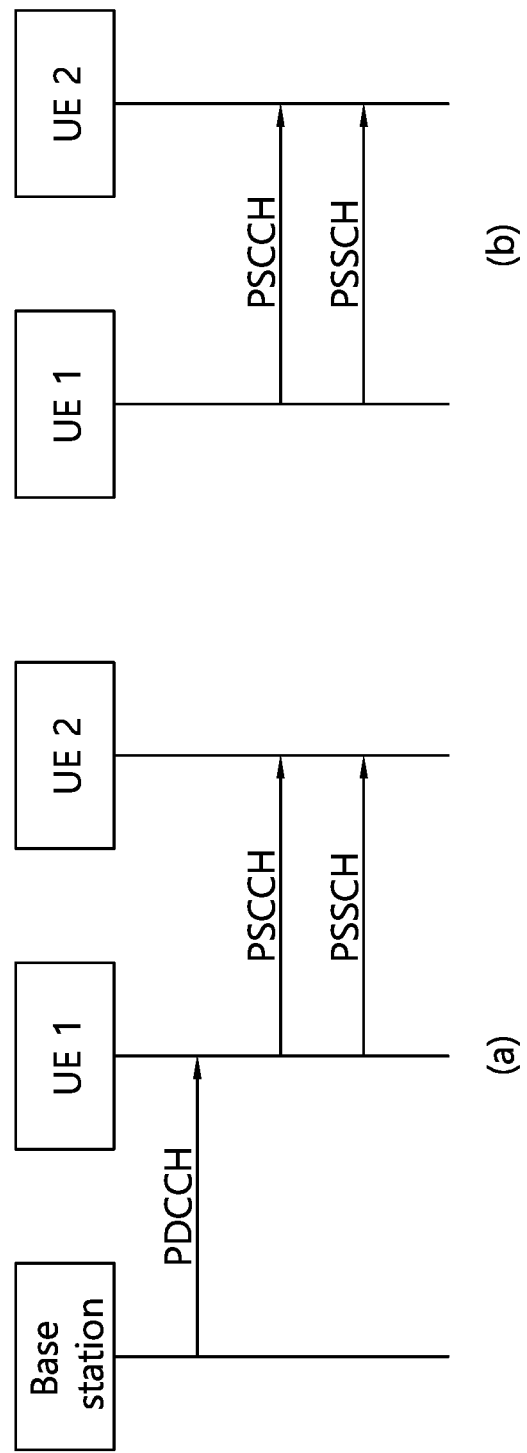
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
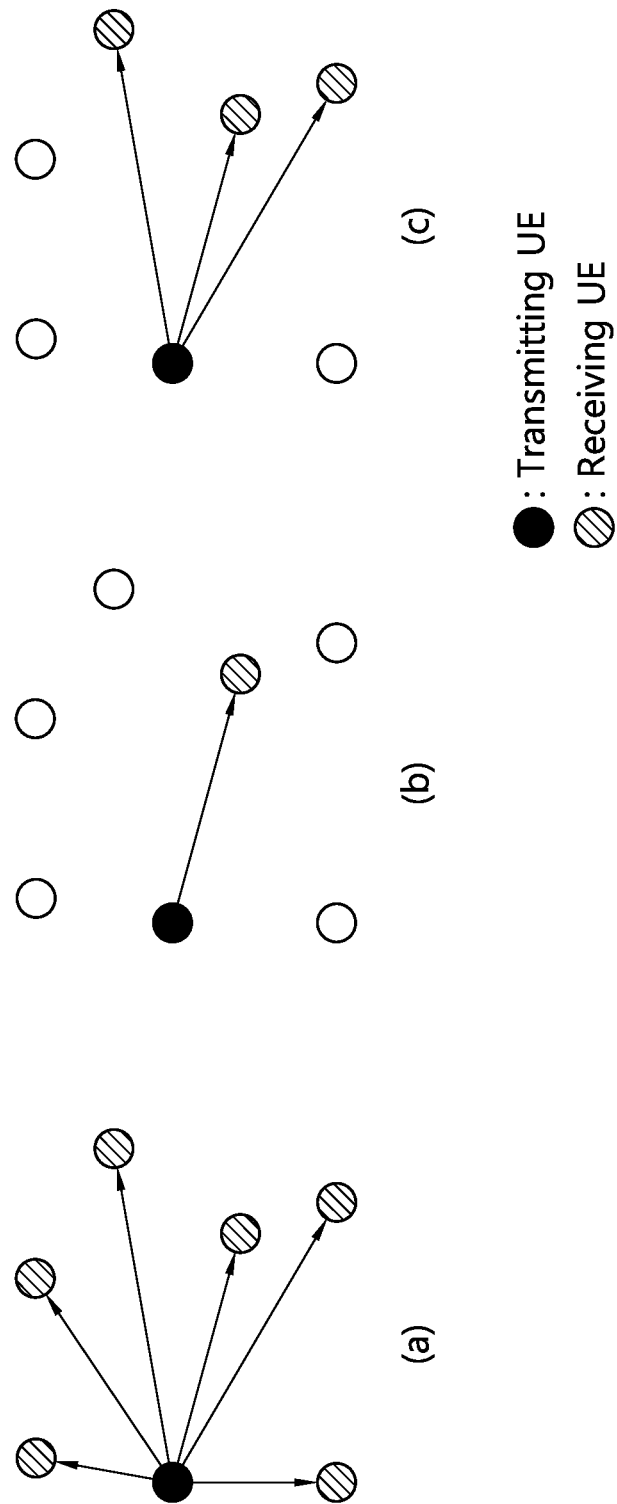
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in a wireless communication system, a DCI format size may be limited in order to reduce the complexity of a UE (especially, for example, the number of circuits or logic for decoding control information, etc.). More specifically, for example, in the Uu link, the total number of DCI format sizes expected by the UE in a semi-static manner may be four, and at the same time, the number of DCI format sizes scrambled with C-RNTI may be three. The above-described restriction on the number of DCI format sizes may be referred to as a DCI format size budget. In order to satisfy the DCI format size budget, the UE may perform size matching to achieve a specific size with respect to some DCI format sizes. More specifically, for example, when the DCI format budget is not satisfied, size matching may be performed to match the size of DCI format 1_0/0_0 in UE-specific search space (USS) to the size of DCI format 1_0/0_0 in common search space (CSS). For example, when the DCI format budget is not satisfied, the UE may perform size matching so that the size of DCI format 1_0/0_0 in USS is the same as the size of DCI format 1_0/0_0 in CSS.

Meanwhile, in terms of the complexity of the UE, equally or similarly, it may be necessary to limit a size of the SCI format for sidelink control information. For example, the UE may need to perform size matching with respect to the SCI format size.

Meanwhile, in the NR V2X system, SCI may be separated into two parts (hereinafter, 2-stage SCI). In addition, a size of a specific SCI part (e.g., 2nd SCI) may vary, and a size and/or configuration of a specific SCI part may be indicated by another specific SCI part (e.g., 1st SCI). For example, a separate encoding or decoding process may be required for each SCI part. For example, it may be necessary to limit the total number of possible sizes for a specific SCI part (e.g., 2nd SCI) in consideration of the complexity of the aforementioned UE. For example, size matching in which a size of a candidate for a specific SCI part (e.g., 2nd SCI) is adjusted to a specific size may be required.

Therefore, hereinafter, according to various embodiments of the present disclosure, a method for setting/managing an SCI format size assumed/used for sidelink communication and an apparatus supporting the same are proposed.

Figure 12:
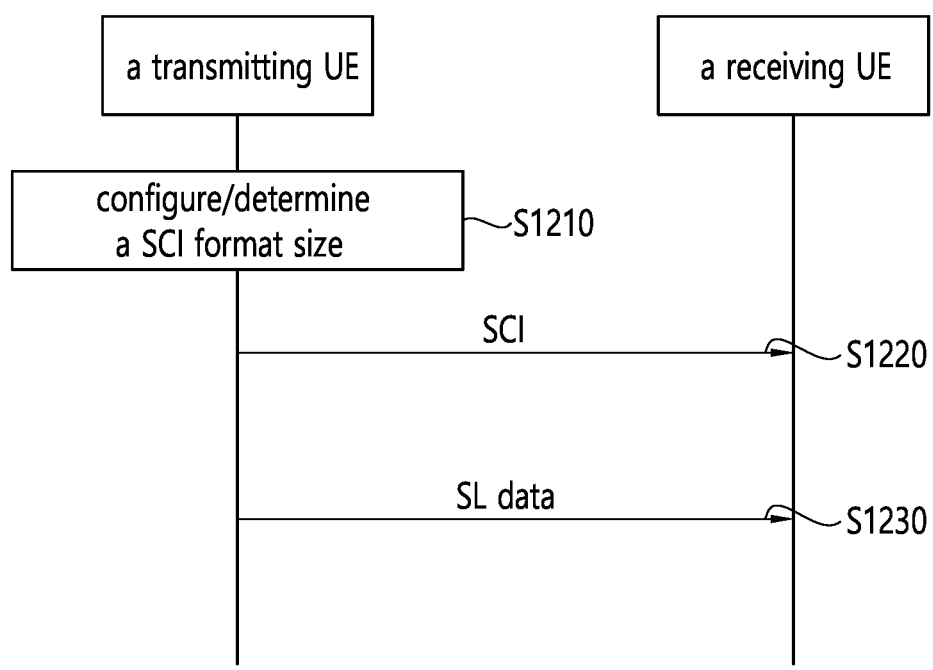
FIG. 12 shows a procedure in which a transmitting UE configures/determines a SCI format size and transmits a SCI to a receiving UE, in accordance with an embodiment of the present disclosure.

FIG. 12 shows a procedure in which a transmitting UE configures/determines a SCI format size and transmits a SCI to a receiving UE, in accordance with an embodiment of the present disclosure. The embodiment of FIG. 12 may be combined with various embodiments of the present disclosure.

Referring to FIG. 12, in step S1210, the transmitting UE may configure/determine a SCI format size. Herein, for example, the transmitting UE may be a UE transmitting sidelink control information and/or sidelink data to another UE. For example, the receiving UE may be a UE that receives sidelink control information and/or sidelink data from another UE.

According to an embodiment of the present disclosure, in order to avoid an additional increase in complexity of the UE, a DCI format size and a SCI format size may be considered together within a DCI format size budget. For example, the transmitting UE may consider both the DCI format size and the SCI format size within the DCI format size budget. More specifically, for example, the transmitting UE may measure the number of SCI format sizes in addition to the number of DCI format sizes in the process of checking the DCI format size budget. For example, the transmitting UE may measure the number of DCI format sizes and the number of SCI format sizes in the process of checking the DCI format size budget. For example, in the case of 2-stage SCI, since a size of a specific SCI part may vary, the transmitting UE may measure all candidate sizes for the specific SCI part. Hereinafter, in various embodiments of the present disclosure, a candidate size for a specific SCI part may be included in the SCI format size.

Meanwhile, considering sidelink communication between UEs connected to an out-of-coverage UE or different base stations (e.g., gNB), it may not be suitable for the transmitting UE to size-match a SCI format size to a specific DCI format size. For example, as a suboptimal solution, if both the SCI format size and the DCI format size do not satisfy a DCI/SCI format size budget, the transmitting UE may change a size of a specific DCI format to a specific size. More specifically, for example, when the DCI/SCI format size budget is not satisfied due to the addition of the SCI format size, the transmitting UE may perform size matching in which the size of DCI format 1_0/0_0 in the USS is adjusted to the size of DCI 1_0/0_0 in the CSS. For example, if the DCI/SCI format size budget is not satisfied even after the size matching is performed, the transmitting UE may change the size of a specific SCI format to a specific size.

According to an embodiment of the present disclosure, the transmitting UE may configure/determine a SCI format size based on a SCI format size budget separately from a DCI format size budget. For example, the SCI format size budget may be additionally introduced separately from the DCI format size budget. For example, the transmitting UE may perform confirmation of the DCI format size budget only for the DCI format size, and may perform the confirmation of the SCI format size budget only on the SCI format size. For example, the total number of SCI format sizes may be N. For example, the total number of SCI format sizes may be limited to N. For example, the total number of SCI format sizes may be predefined or (pre-) configured. More specifically, for example, the total number of SCI format sizes may be (pre-) configured based on a resource pool. For example, the total number of SCI format sizes may (pre-) configured for each resource pool.

According to an embodiment of the present disclosure, the transmitting UE may perform size matching for a specific SCI format size in order to satisfy the DCI/SCI format size budget. For example, it may be assumed that a SCI format size in sidelink communication related to broadcast is always the same. For example, in the case of broadcast sidelink communication that is basically expected to be received by an unspecified UE, it may be assumed that a SCI format size is always the same. More specifically, for example, the SCI format size may be predefined or (pre-) configured according to a resource pool.

Meanwhile, for example, similar to the broadcast described above, even in the case of a connection-less groupcast (e.g., when the transmitting UE has no information about the receiving UE), it may be a situation in which an unspecified UE is expected to receive. For example, in the case of a connection-less groupcast, an unspecified UE may be expected to receive sidelink control information or sidelink data. Accordingly, for example, the SCI format size may be predefined or (pre-)configured according to a resource pool.

Meanwhile, for example, in the case of a groupcast sidelink or a unicast sidelink, a SCI contents configuration may be different based on (pre-)configuration. For example, in the case of a groupcast sidelink or a unicast sidelink, the SCI contents configuration may be different through the (pre-)configuration. For example, in a case of a transmitting UE-receiving UE distance (TX-RX distance)-based HARQ feedback, a SCI may include information related to location information of the transmitting UE or location information of the transmitting UE. For example, in the case of the TX-RX distance based HARQ feedback, the transmitting UE may provide location information of the transmitting UE or information related to the location information of the transmitting UE to the receiving UE through the SCI. For example, the SCI content configuration may be changed based on a transmission/reception scheme (e.g., a resource allocation scheme, whether DMRS is variable, whether to perform CSI feedback, and/or a size of a resource pool, etc.). For example, the transmitting UE may determine the SCI content configuration based on a transmission/reception scheme (e.g., a resource allocation scheme, whether DMRS is variable, whether to perform CSI feedback, and/or a size of a resource pool, etc.). For example, when a sensing operation is considered, it may be necessary for an unspecified UE to perform SCI decoding. In this case, the SCI format size may be predefined or (pre-)configured again.

Meanwhile, for example, a plurality of resource pools may be (pre-) configured for the receiving UE. In this case, when the SCI format size is different for each resource pool, the number of SCI format sizes may not satisfy the SCI format size budget. For example, the receiving UE may receive a plurality of reception resource pools (pre-) configured, and when the SCI format size is different for each reception resource pool (e.g., at least for groupcast or unicast), the SCI format size budget may not be satisfied In this case, for example, size matching may be required to satisfy the SCI format size budget. For example, the transmitting UE may perform size matching for the SCI format size to satisfy the SCI format size budget. For example, based on at least one of a resource pool, a cast type (e.g. broadcast/groupcast/unicast), a groupcast type (e.g. connection-oriented/connection-less) or unicast session, the SCI format size may be predefined or (pre-) configured. For example, the number of SCI format sizes may not exceed the SCI format size budget. For example, the receiving UE may not consider the number of SCI format sizes exceeding the SCI format size budget to occur. That is, for example, the SCI format size budget may be guaranteed based on the above-described configuration or pre-configuration. For example, the SCI format size may be configured to be larger than the amount required for the actual SCI field. For example, the size of the SCI format may be configured larger than the amount required for the actual SCI field by adding padding bits.

In step S1220, the transmitting UE may transmit the SCI to the receiving UE based on the configured/determined SCI format size. For example, the transmitting UE may transmit the SCI to the receiving UE on a PSCCH and/or a PSSCH based on the configured/determined SCI format size. In step S1230, the transmitting UE may transmit sidelink data related to the SCI to the receiving UE. For example, the transmitting UE may transmit sidelink data to the receiving UE on the PSSCH related to the SCI.

Meanwhile, in the NR V2X system, the SCI format may be divided into two parts (hereinafter, 2-stage SCI), and a form in which each part is encoded and transmitted may be introduced. For example, each SCI format part may require a separate encoding or decoding process. For example, in the 1st-stage, it may be expected that an unspecified UE receives the SCI. For example, an unspecified UE may receive SCI in the 1st-stage for a sensing operation. Thereafter, for example, information for receiving and decoding the SCI of the 2nd-stage may be indicated by the SCI of the 1st-stage. For example, the UE may receive information for receiving and decoding the 2nd-stage SCI based on the 1st-stage SCI. For example, in the 2nd-stage, it may be expected that the receiving UE receives a SCI, and the SCI of the 2nd-stage may include information for demodulation and decoding of a PSSCH. For example, the receiving UE may receive a 2-stage SCI including information for demodulation and decoding of a PSSCH. The UE may use the 2nd-stage SCI to variably use the above-described various transmission/reception methods. Accordingly, for example, the size of the 2nd-stage SCI and the SCI content configuration of the 2nd-stage SCI may vary based on a value indicated by the 1st-stage SCI. For example, the receiving UE may perform decoding preparation according to a variable 2nd-stage SCI size. Due to this, the complexity of the UE may increase. Therefore, for example, as in the above-described embodiments, the number of sizes of 2nd-stage SCI candidates may be limited.

Figure 13:
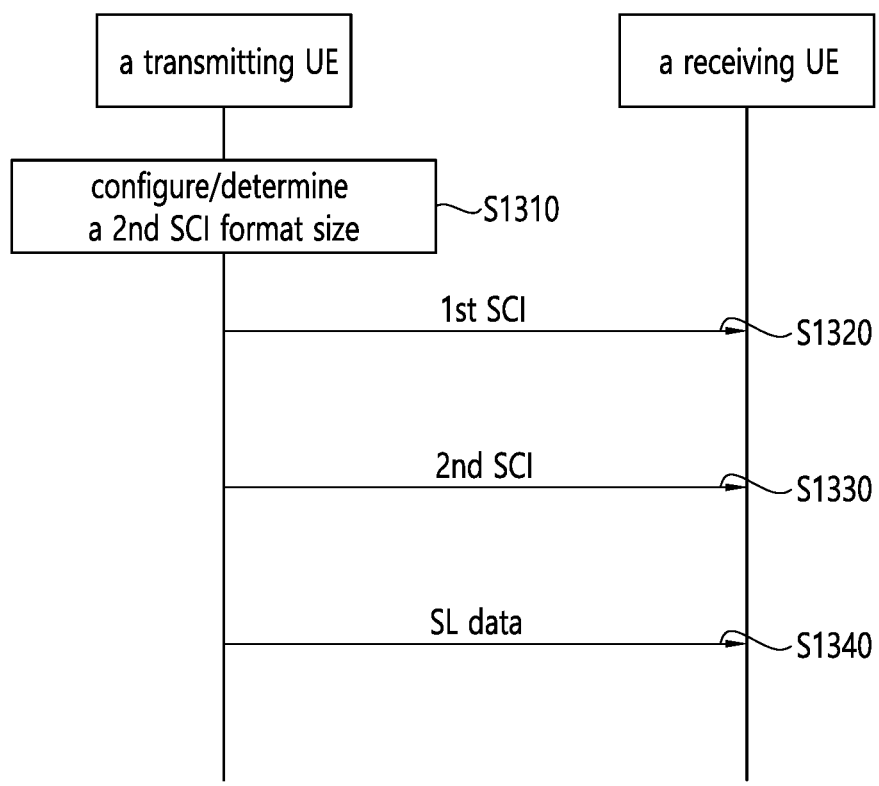
FIG. 13 shows a procedure in which a transmitting UE configures/determines a 2nd SCI format size and transmits a 1st SCI and a 2nd SCI to a receiving UE, in accordance with an embodiment of the present disclosure.

FIG. 13 shows a procedure in which a transmitting UE configures/determines a 2nd SCI format size and transmits a 1st SCI and a 2nd SCI to a receiving UE, in accordance with an embodiment of the present disclosure. The embodiment of FIG. 13 may be combined with various embodiments of the present disclosure.

Referring to FIG. 13, in step S1310, the transmitting UE may configured/determine the 2nd SCI format size.

According to an embodiment, a size of each candidate of SCI for the 2nd-stage may be configured or pre-configured, and the receiving UE may consider that the SCI format size budget is satisfied. For example, the transmitting UE may configure or pre-configure the size of each candidate of SCI for the 2nd-stage. For example, the transmitting UE may configure or pre-configure the size of each candidate of SCI for the 2nd-stage so that the SCI format size budget of the receiving UE is satisfied.

Alternatively, for example, when the number of SCI candidate sizes for the 2nd-stage exceeds the SCI format size budget, the transmitting UE may perform size matching for an SCI candidate for a specific 2nd-stage. More specifically, for example, the transmitting UE may add padding bits to the SCI candidate for the specific 2nd-stage until a size of the SCI candidate for the specific 2nd-stage becomes the same as a SCI size for the 1st-stage. For example, the SCI candidate for the specific 2nd-stage may be an SCI candidate with the smallest size among a plurality of SCI candidates for 2nd-stages. Alternatively, for example, the SCI candidate for the specific 2nd-stage may be the largest SCI candidate among at least one candidate smaller in size than the SCI candidate for the 1st-stage among the plurality of SCI candidates for the 2nd-stage. For example, the transmitting UE may perform size matching until the SCI format size budget is satisfied. Alternatively, for example, the transmitting UE may add padding bits until the size of the SCI candidate for the specific 2nd-stage becomes the same as the size of the largest SCI candidate among the plurality of SCI candidates for the 2nd-stage. For example, when one or more SCI candidates for 2nd-stage are of the same size, the SCI candidates for the 2nd-stage that are a target of size matching may be one or more SCI candidates for the 2nd-stages having the same size.

In step S1320, the transmitting UE may transmit a 1st SCI to the receiving UE. For example, the transmitting UE may transmit the 1st SCI to the receiving UE on a PSCCH. For example, the 1st SCI may indicate a content configuration and a total size of the 2nd SCI.

In step S1330, the transmitting UE may transmit a 2nd SCI to the receiving UE based on a configured/determined 2nd SCI format size. For example, the transmitting UE may transmit the 2nd SCI to the receiving UE a PSSCH based on the configured/determined 2nd SCI format size. For example, the receiving UE may receive information for receiving and decoding the 2nd-stage SCI based on the 1st-stage SCI.

In step S1340, the transmitting UE may transmit sidelink data to the receiving UE. For example, the transmitting UE may transmit sidelink data to the receiving UE on the PSSCH.

Figure 14:
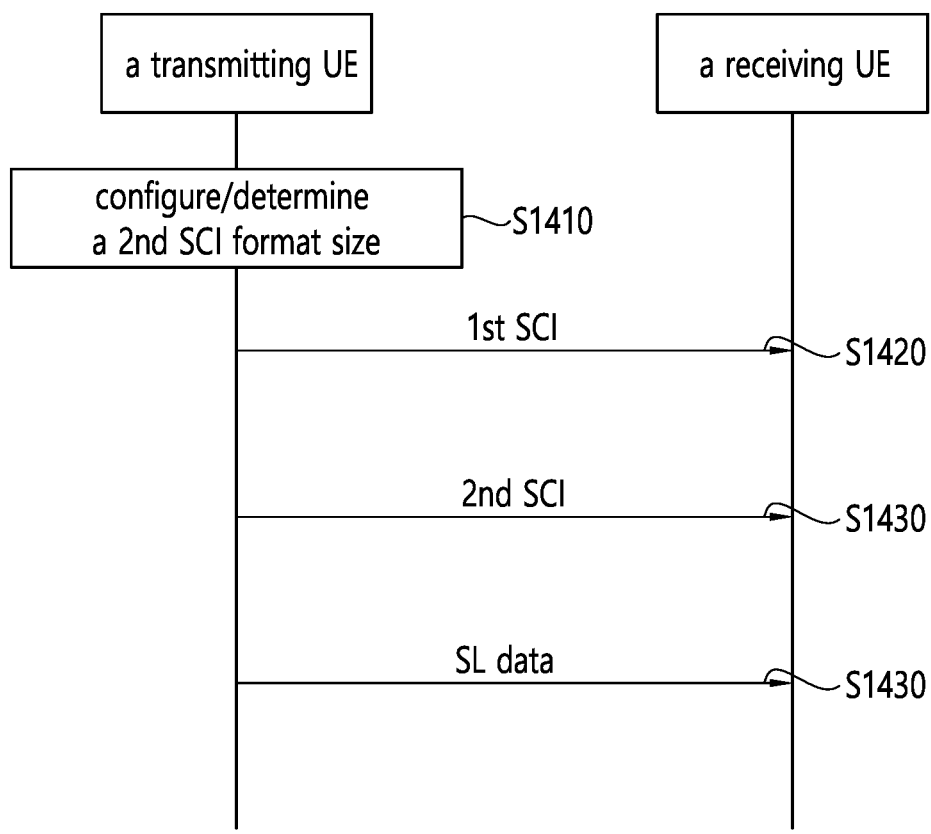
FIG. 14 shows a procedure in which a transmitting UE configures/determines a 2nd SCI format and transmits a 1st SCI and a 2nd SCI to a receiving UE, in accordance with an embodiment of the present disclosure.

FIG. 14 shows a procedure in which a transmitting UE configures/determines a 2nd SCI format and transmits a 1st SCI and a 2nd SCI to a receiving UE, in accordance with an embodiment of the present disclosure. The embodiment of FIG. 14 may be combined with various embodiments of the present disclosure.

Referring to FIG. 14, in step S1410, the transmitting UE may configure/determine a 2nd SCI format or a 2nd SCI format candidate.

For example, a specific 2nd SCI format candidate may correspond to a plurality of cast types (e.g., broadcast, groupcast, unicast). For example, the transmitting UE may determine a 2nd SCI format based on the cast type. For example, a specific 2nd SCI format candidate may correspond to a HARQ feedback method (e.g., a method for transmitting only NACK, a method for transmitting ACK or NACK). For example, the transmitting UE may determine a 2nd SCI format based on the HARQ feedback method. For example, a specific 2nd SCI format candidate may correspond to a combination of a plurality of cast types and/or a HARQ feedback method. For example, the transmitting UE may determine a 2nd SCI format based on a combination of a cast type and/or a HARQ feedback method.

More specifically, for example, the specific 2nd SCI format candidate may be SCI format 0-3. For example, the SCI format 0-3 may be defined as shown in Table 5 below.

TABLE 5

SCI format 0-3 is used for the decoding of PSSCH.
The following information is transmitted by means of the SCI format 0-3:
HARQ Process ID - [x] bits
New data indicator - 1 bit
Redundancy version - 2 bits
Source ID - 8 bits
Destination ID - 16 bits
Zone ID - [12] bits
Communication range requirement - [4] bits For example, the specific 2nd SCI format candidate may include a Zone ID and/or a communication range requirement. For example, the transmitting UE may allocate/use a specific 2nd SCI format candidate for groupcast in which HARQ feedback option 1 (i.e., a method of transmitting only NACK) is used. For example, the specific 2nd SCI format candidate may include at least one of a L1-source ID, a L1-destination ID, a HARQ process ID, a new data indicator (NDI), a redundancy version (RV), a Zone ID, a communication range requirement, and/or a HARQ feedback request field. In addition, for example, the specific 2nd SCI candidate may include an explicit indicator of whether HARQ feedback is activated. In addition, for example, the specific 2nd SCI candidate may include an explicit indicator for group cast option 1 (a method of transmitting only NACK) or group cast option 2 (a method of transmitting ACK or NACK). In addition, for example, the specific 2nd SCI candidate may include an explicit indicator for a cast type.

For example, the specific 2nd SCI format candidate may be SCI format 0-2. For example, SCI format 0-2 may be defined as shown in Table 6 below.

TABLE 6

SCI format 0-2 is used for the decoding of PSSCH.
The following information is transmitted by means of the SCI format 0-2:
HARQ Process ID - [x] bits
New data indicator - 1 bit
Redundancy version - 2 bits
Source ID - 8 bits
Destination ID - 16 bits
HARQ feedback indicator - 2 bits
CSI request - 1 bit For example, a HARQ feedback request field (e.g., HARQ feedback indicator) may be excluded from the specific 2nd SCI format candidate. For example, in order to disable HARQ feedback, the transmitting UE may use another 2nd SCI format candidate.

For example, the transmitting UE may use the specific 2nd SCI format candidate to support a remaining cast type and/or a HARQ feedback option. For example, the 2nd SCI format candidate may correspond to a broadcast, a unicast, and/or a groupcast that does not use distance-based HARQ feedback method.

For example, the transmitting UE may determine a 2nd SCI format based on a broadcast, unicast, and/or distance-based HARQ feedback method. For example, the 2nd SCI format candidate may include at least one of a L1-source ID, a L1-destination ID, a HARQ process ID, a new data indicator (NDI), a redundancy version (RV), a HARQ feedback request field, CSI reporting triggering, and/or a factor for distinguishing between unicast and groupcast. More specifically, for example, the transmitting UE may indicate/transmit a HARQ request field and/or a factor for distinguishing unicast and groupcast in a joint indication manner. For example, the transmitting UE may indicate/inform at least one of whether HARQ feedback is disabled, a HARQ feedback for unicast, a groupcast HARQ feedback option 1 and/or a groupcast HARQ feedback option 2 using a 2-bit field. For example, in the case where a UE (i.e., a receiving UE) that has received a PSCCH/PSSCH is instructed to unicast HARQ feedback from a corresponding field, and in the case where a receiving UE is indicated a groupcast HARQ feedback option 2, the resources used by the receiving UE for PSFCH transmission may be different according to a member ID of the receiving UE. In addition, for example, the specific 2nd SCI candidate may include an explicit indicator of whether HARQ feedback is activated. In addition, for example, the specific 2nd SCI candidate may include an explicit indicator for a group cast option 1 (a method of transmitting only NACK) or a group cast option 2 (a method of transmitting ACK or NACK). In addition, for example, the specific 2nd SCI candidate may include an explicit indicator for a cast type.

For example, the UE that has transmitted a PSCCH/PSSCH (i.e., the transmitting UE) may use/transmit the 2nd SCI format candidate. In this case, if the PSSCH corresponds to a broadcast, a value of a factor for distinguishing between a unicast and a groupcast and/or a value for a HARQ feedback request may always be in the form of indicating HARQ feedback disable. For example, if the PSSCH corresponds to a broadcast, CSI reporting triggering may be in the form of indicating disable. For example, if the PSSCH corresponds to a broadcast, a value of a factor for distinguishing between a unicast and a groupcast and/or a value for a HARQ feedback request may always be in the form of indicating HARQ feedback disable, and CSI Reporting triggering may always be in the form of indicating disable.

For example, if the PSSCH corresponds to a unicast, a value for the HARQ feedback request and/or a value of a factor for distinguishing between a unicast and a groupcast may be in the form of indicating HARQ feedback for unicast.

For example, if the PSSCH corresponds to a groupcast, a value for the HARQ feedback request and/or a value of a factor for distinguishing between a unicast and a groupcast may be in the form of indicating a groupcast HARQ feedback option 1 or a groupcast HARQ feedback option 2. For example, if the PSSCH corresponds to a groupcast, CSI reporting triggering may be in the form of indicating disable. If the PSSCH corresponds to groupcast, a value for the HARQ feedback request and/or a value of a factor for distinguishing between a unicast and a groupcast may be in the form of indicating a groupcast HARQ feedback option 1 or a groupcast HARQ feedback option 2, and CSI reporting triggering may be in the form of indicating disable.

According to an embodiment of the present disclosure, the UE/base station can efficiently manage the type/number of control information sizes. Accordingly, there may be an effect of simplifying/minimizing the complexity of the UE/base station for decoding control information.

Figure 15:
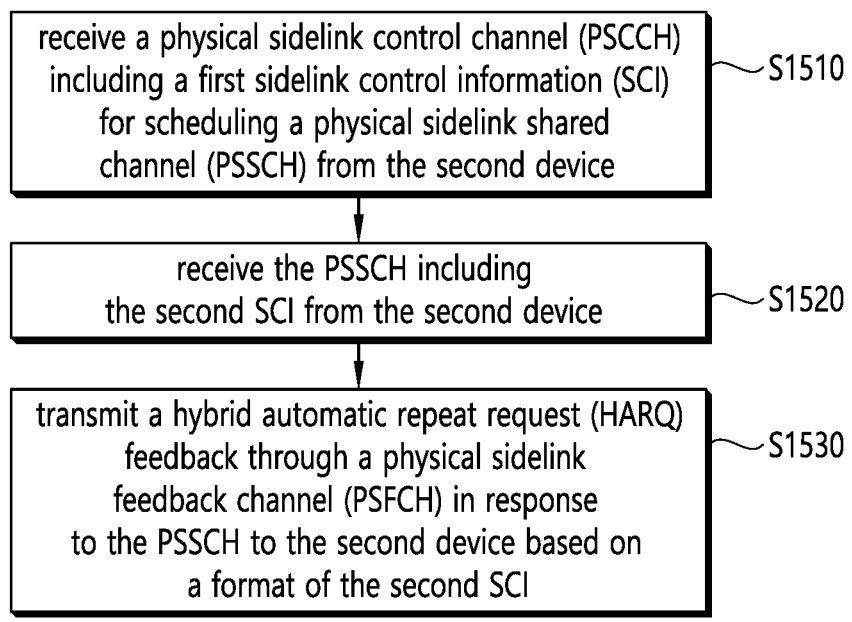
FIG. 15 shows a method for a first device to transmit a HARQ feedback to a second device based on a format of a second SCI, in accordance with an embodiment of the present disclosure.

FIG. 15 shows a method for a first device to transmit a HARQ feedback to a second device based on a format of a second SCI, in accordance with an embodiment of the present disclosure. The embodiment of FIG. 15 may be combined with various embodiments of the present disclosure.

Referring to FIG. 15, in step S1510, the first device 100 may receive a physical sidelink control channel (PSCCH) including a first sidelink control information (SCI) for scheduling a physical sidelink shared channel (PSSCH) from the second device 200. For example, the first device 100 may receive the first SCI from the second device 200 on the PSCCH. Herein, for example, the PSSCH may be scheduled by the first SCI.

In step S1520, the first device 100 may receive the PSSCH including the second SCI from the second device 200. For example, the PSSCH may be a PSSCH scheduled by the first SCI. For example, the second SCI may include a field related to whether HARQ feedback is enabled. For example, the second SCI may include a field indicating whether HARQ feedback is enabled.

For example, the format of the second SCI may be any one of a first format or a second format. For example, the HARQ feedback may not include an acknowledgment (ACK) and may include a negative-acknowledgement (NACK), based on that the format of the second SCI is the first format. For example, the first format of the second SCI may be a format corresponding to a HARQ feedback method in which an ACK is not transmitted when decoding of the PSSCH is successful, and a NACK is transmitted when decoding of the PSSCH is unsuccessful. For example, the first format of the second SCI may be a format corresponding to a group cast option 1.

For example, based on the format of the second SCI being the second format, the HARQ feedback may include ACK or NACK. For example, the second format of the second SCI may be a format corresponding to a HARQ feedback method in which ACK is transmitted when decoding of PSSCH is successful and NACK is transmitted when decoding of PSSCH fails. For example, based on the format of the second SCI being the second format, the second SCI may include a factor or information related to a cast type. For example, based on the format of the second SCI being the second format, the second SCI may include a factor or information indicating a cast type. For example, the HARQ feedback may be performed, based on the field indicating enable of the HARQ feedback. For example, the HARQ feedback may not be performed, based on the field indicating disable of the HARQ feedback. For example, the field may be a field indicating whether HARQ feedback is enabled. For example, the first device 100 may determine the format of the second SCI as the first format based on a groupcast in which the HARQ feedback option 1 (i.e., the method of transmitting only NACK) is used.

For example, the first device 100 may determine the format of the second SCI as the second format based on a broadcast, unicast, and/or a groupcast that does not use distance-based HARQ feedback method.

For example, a format size of the first SCI or a format size of the second SCI may be pre-configured based on at least one of a cast type or a resource pool. For example, the number of format sizes of the second SCI may be determined within a format size budget of the second SCI. For example. For example, the first device 100 may determine the number of format sizes of the second SCI within a format size budget of the second SCI. For example, at least one of a configuration of the second SCI or a size of the second SCI may be determined differently based on a value included in the first SCI. For example, a plurality of candidate sizes for the second SCI may be pre-configured. For example, padding bits may be added until a size of any one selected among the plurality of candidate sizes is equal to a size of the first SCI, based on the number of the plurality of candidate sizes exceeding a format size budget of the second SCI. The first device 100 may add padding bits until a size of any one selected among the plurality of candidate sizes is equal to a size of the first SCI, based on the number of the plurality of candidate sizes exceeding a format size budget of the second SCI. For example, padding bits may be added until a size of any one selected among the plurality of candidate sizes is equal to the largest candidate size among the plurality of candidate sizes, based on the number of the plurality of candidate sizes exceeding a format size budget of the second SCI. The first device 100 may add padding bits until a size of any one selected among the plurality of candidate sizes is equal to the largest candidate size among the plurality of candidate sizes, based on the number of the plurality of candidate sizes exceeding a format size budget of the second SCI.

For example, the second SCI may include a Zone ID and a communication range requirement based on the second SCI being the first format. For example, the second SCI may include at least one of a L1-source ID, a L1-destination ID, a HARQ process ID, a new data indicator (NDI), a redundancy version (RV), a Zone ID, a communication range requirement, and/or a HARQ feedback request field, based on the second SCI being the first format.

For example, the second SCI may include at least one of a L1-source ID, a L1-destination ID, a HARQ process ID, a new data indicator (NDI), a redundancy version (RV), a HARQ feedback request field, CSI reporting triggering, and/or a factor for distinguishing between unicast and groupcast, based on the second SCI being the second format.

In step S1530, the first device 100 may transmit a hybrid automatic repeat request (HARQ) feedback through a physical sidelink feedback channel (PSFCH) in response to the PSSCH to the second device 200 based on a format of the second SCI.

For example, the HARQ feedback may be performed, based on a field indicating enable of the HARQ feedback included in the second SCI. For example, the field may be a field indicating whether HARQ feedback is enabled. For example, the first device 100 may perform HARQ feedback based on the HARQ feedback method based on the format of the second SCI. For example, based on the format of the second SCI, the first device 100 may not transmit an ACK if decoding of the PSSCH is successful, and may transmit a NACK if decoding of the PSSCH fails. For example, based on the format of the second SCI, the first device 100 may transmit an ACK if decoding of the PSSCH is successful, and may transmit a NACK if decoding of the PSSCH fails. For example, the HARQ feedback may not be performed, based on a field indicating disable of the HARQ feedback. For example, the field may be a field indicating whether HARQ feedback is enabled.

The above-described embodiment may be applied to various devices to be described below. First, for example, the processor 102 of the first device 100 may control the transceiver 106 to receive a physical sidelink control channel (PSCCH) including a first sidelink control information (SCI) for scheduling a physical sidelink shared channel (PSSCH) from the second device 200. And, for example, the processor 102 of the first device 100 may control the transceiver 106 to receive the PSSCH including the second SCI from the second device 200. And, for example, the processor 102 of the first device 100 may control the transceiver 106 to transmit a hybrid automatic repeat request (HARQ) feedback through a physical sidelink feedback channel (PSFCH) in response to the PSSCH to the second device 200 based on a format of the second SCI.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a second device, a physical sidelink control channel (PSCCH) including a first sidelink control information (SCI) for scheduling a physical sidelink shared channel (PSSCH), receive, from the second device, the PSSCH including a second SCI, and transmit, to the second device, a hybrid automatic repeat request (HARQ) feedback through a physical sidelink feedback channel (PSFCH) in response to the PSSCH based on a format of the second SCI.

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive, from a second UE, a physical sidelink control channel (PSCCH) including a first sidelink control information (SCI) for scheduling a physical sidelink shared channel (PSSCH), receive, from the second UE, the PSSCH including a second SCI, and transmit, to the second UE, a hybrid automatic repeat request (HARQ) feedback through a physical sidelink feedback channel (PSFCH) in response to the PSSCH based on a format of the second SCI.

According to an embodiment of the present disclosure, a non-transitory computer-readable storage medium storing instructions may be provided. For example, the instructions, when executed, cause a first device to: receive, by a first device from a second device, a physical sidelink control channel (PSCCH) including a first sidelink control information (SCI) for scheduling a physical sidelink shared channel (PSSCH), receive, by the first device from the second device, the PSSCH including a second SCI, and transmit, by the first device to the second device, a hybrid automatic repeat request (HARQ) feedback through a physical sidelink feedback channel (PSFCH) in response to the PSSCH based on a format of the second SCI.

Figure 16:
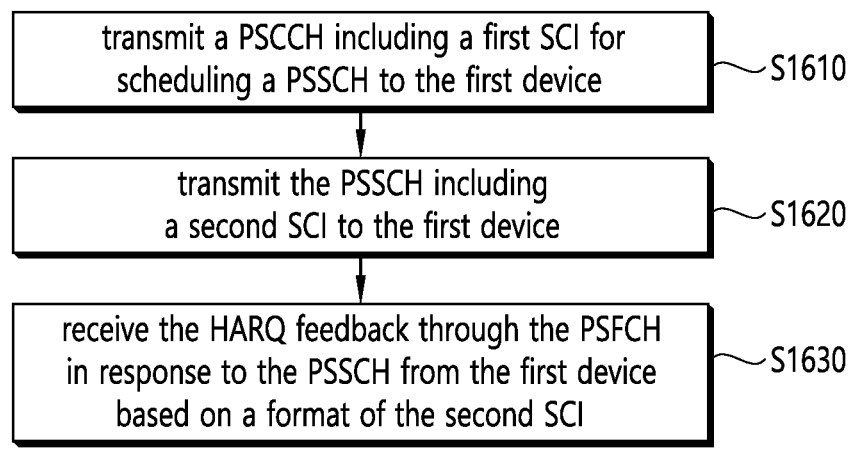
FIG. 16 shows a method for a second device to receive HARQ feedback from a first device, in accordance with an embodiment of the present disclosure.

FIG. 16 shows a method for a second device to receive HARQ feedback from a first device, in accordance with an embodiment of the present disclosure. The embodiment of FIG. 16 may be combined with various embodiments of the present disclosure.

Referring to FIG. 16, in step S1610, the second device 200 may transmit a PSCCH including a first SCI for scheduling a PSSCH to the first device 100. For example, the second device 200 may receive the first SCI from the first device 100 on a PSCCH. Herein, for example, the PSSCH may be scheduled by the first SCI.

In step S1620, the second device 200 may transmit the PSSCH including a second SCI to the first device 100. For example, the format of the second SCI may be any one of a first format or a second format. For example, the HARQ feedback may not include an acknowledgment (ACK) and may include a negative-acknowledgement (NACK), based on that the format of the second SCI is the first format. For example, the first format of the second SCI may be a format corresponding to a HARQ feedback method in which an ACK is not transmitted when decoding of the PSSCH is successful, and a NACK is transmitted when decoding of the PSSCH is unsuccessful.

For example, based on the format of the second SCI being the second format, the HARQ feedback may include ACK or NACK. For example, the second format of the second SCI may be a format corresponding to a HARQ feedback method in which ACK is transmitted when decoding of PSSCH is successful and NACK is transmitted when decoding of PSSCH fails. For example, based on the format of the second SCI being the second format, the second SCI may include a factor or information related to a cast type. For example, based on the format of the second SCI being the second format, the second SCI may include a factor or information indicating a cast type. For example, the HARQ feedback may be performed, based on the field indicating enable of the HARQ feedback. For example, the HARQ feedback may not be performed, based on the field indicating disable of the HARQ feedback. For example, the field may be a field indicating whether HARQ feedback is enabled.

For example, a format size of the first SCI or a format size of the second SCI may be pre-configured based on at least one of a cast type or a resource pool. For example, the number of format sizes of the second SCI may be determined within a format size budget of the second SCI. For example, the first device 100 may determine the number of format sizes of the second SCI within a format size budget of the second SCI. For example, at least one of a configuration of the second SCI or a size of the second SCI may be determined differently based on a value included in the first SCI. For example, a plurality of candidate sizes for the second SCI may be pre-configured. For example, padding bits may be added until a size of any one selected among the plurality of candidate sizes is equal to a size of the first SCI, based on the number of the plurality of candidate sizes exceeding a format size budget of the second SCI. For example, padding bits may be added until a size of any one selected among the plurality of candidate sizes is equal to the largest candidate size among the plurality of candidate sizes, based on the number of the plurality of candidate sizes exceeding a format size budget of the second SCI.

For example, the second SCI may include a Zone ID and a communication range requirement based on the second SCI being the first format. For example, the second SCI may include at least one of a L1-source ID, a L1-destination ID, a HARQ process ID, a new data indicator (NDI), a redundancy version (RV), a Zone ID, a communication range requirement, and/or a HARQ feedback request field, based on the second SCI being the first format.

For example, the second SCI may include at least one of a L1-source ID, a L1-destination ID, a HARQ process ID, a new data indicator (NDI), a redundancy version (RV), a HARQ feedback request field, CSI reporting triggering, and/or a factor for distinguishing between unicast and groupcast, based on the second SCI being the second format.

In step S1630, the second device 200 may receive the HARQ feedback through the PSFCH in response to the PSSCH from the first device 100 based on the format of the second SCI.

For example, the HARQ feedback may be performed, based on a field indicating enable of the HARQ feedback included in the second SCI. For example, the field may be a field indicating whether HARQ feedback is enabled. For example, based on the format of the second SCI, the first device 100 may not transmit an ACK if decoding of the PSSCH is successful, and may transmit a NACK if decoding of the PSSCH fails. For example, the HARQ feedback may not be performed, based on a field indicating disable of the HARQ feedback. For example, the field may be a field indicating whether HARQ feedback is enabled.

The above-described embodiment may be applied to various devices to be described below. First, for example, the processor 202 of the second device 200 may control the transceiver 206 to transmit a PSCCH including a first SCI for scheduling a PSSCH to the first device 100. And, for example, the processor 202 of the second device 200 may control the transceiver 206 to transmit the PSSCH including a second SCI to the first device 100. And, for example, the processor 202 of the second device 200 may control the transceiver 206 to receive the HARQ feedback through the PSFCH in response to the PSSCH from the first device 100 based on the format of the second SCI.

According to an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: transmit, to a first device, a physical sidelink control channel (PSCCH) including a first sidelink control information (SCI) for scheduling a physical sidelink shared channel (PSSCH), transmit, to the first device, the PSSCH including a second SCI, and receive, from the first device, a hybrid automatic repeat request (HARQ) feedback through a physical sidelink feedback channel (PSFCH) in response to the PSSCH based on a format of the second SCI.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
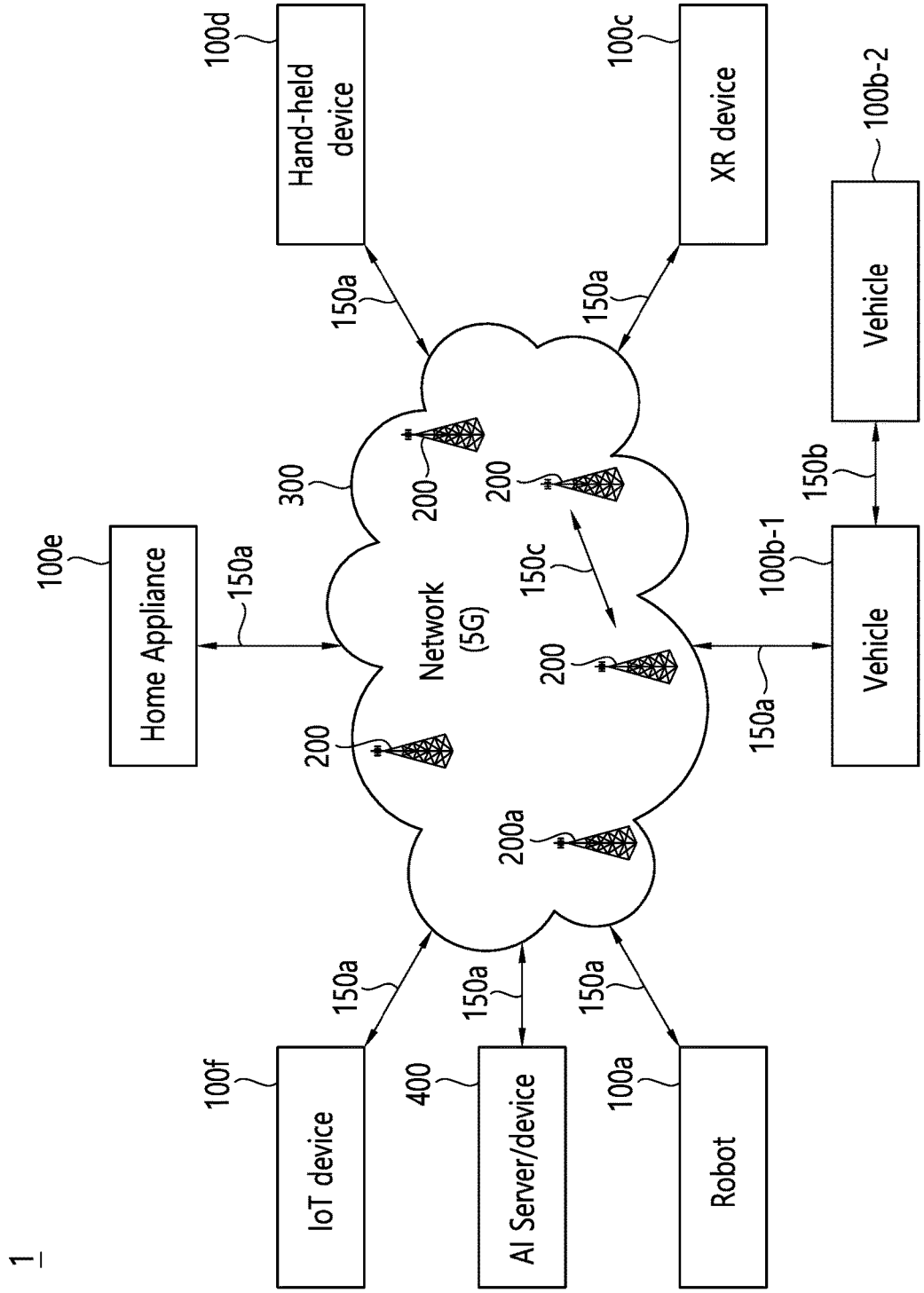
FIG. 17 shows a communication system 1, in accordance with an embodiment of the present disclosure.

FIG. 17 shows a communication system 1, in accordance with an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
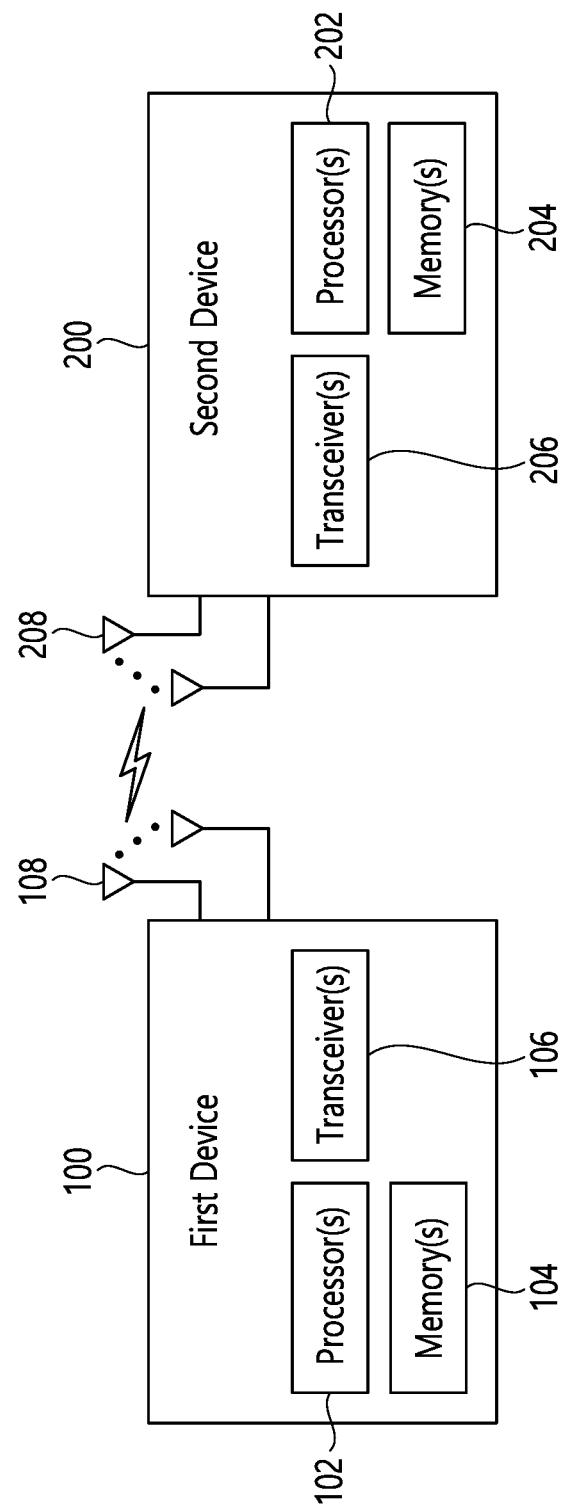
FIG. 18 shows wireless devices, in accordance with an embodiment of the present disclosure.

FIG. 18 shows wireless devices, in accordance with an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
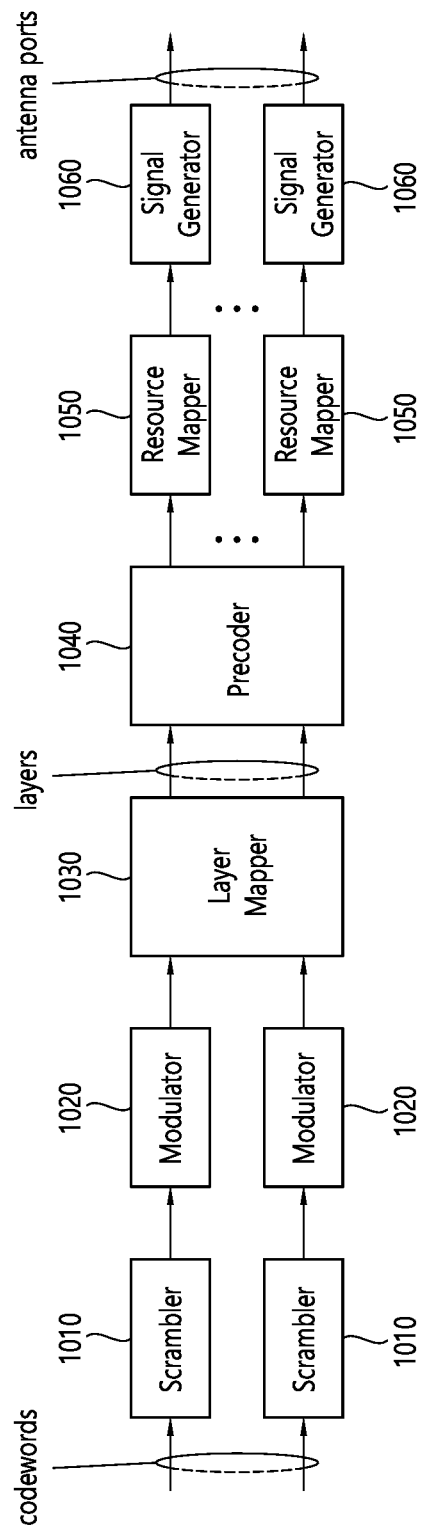
FIG. 19 shows a signal process circuit for a transmission signal, in accordance with an embodiment of the present disclosure.

FIG. 19 shows a signal process circuit for a transmission signal, in accordance with an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
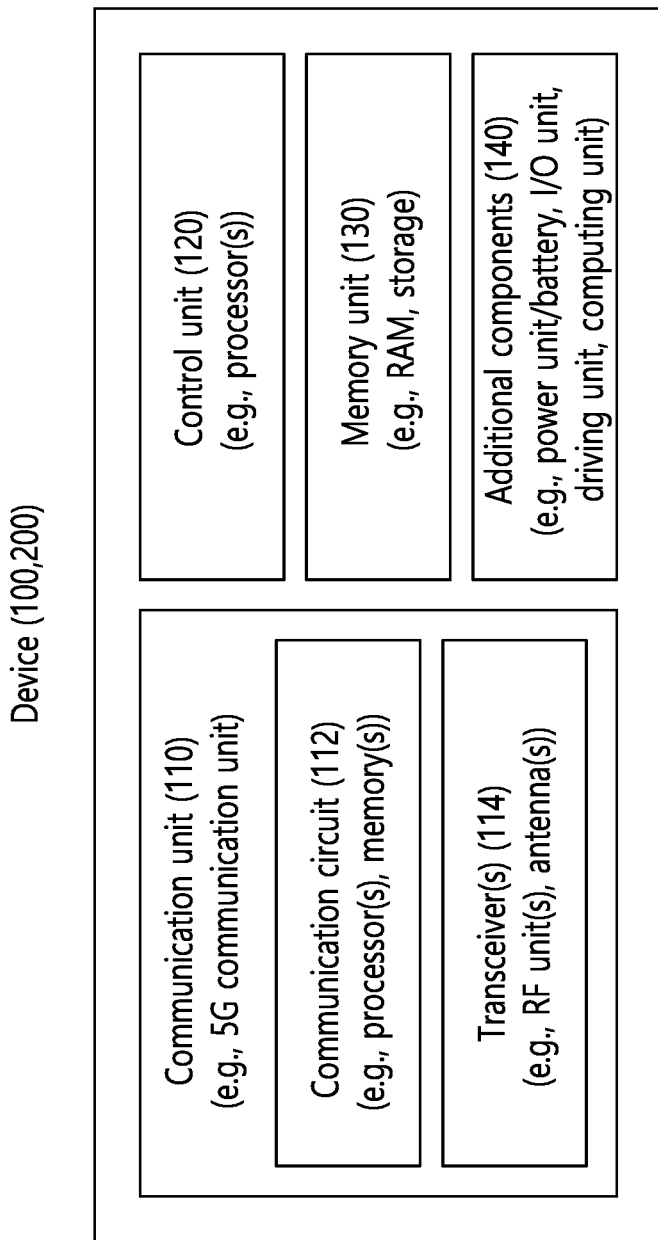
FIG. 20 shows a wireless device, in accordance with an embodiment of the present disclosure.

FIG. 20 shows another example of a wireless device, in accordance with an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
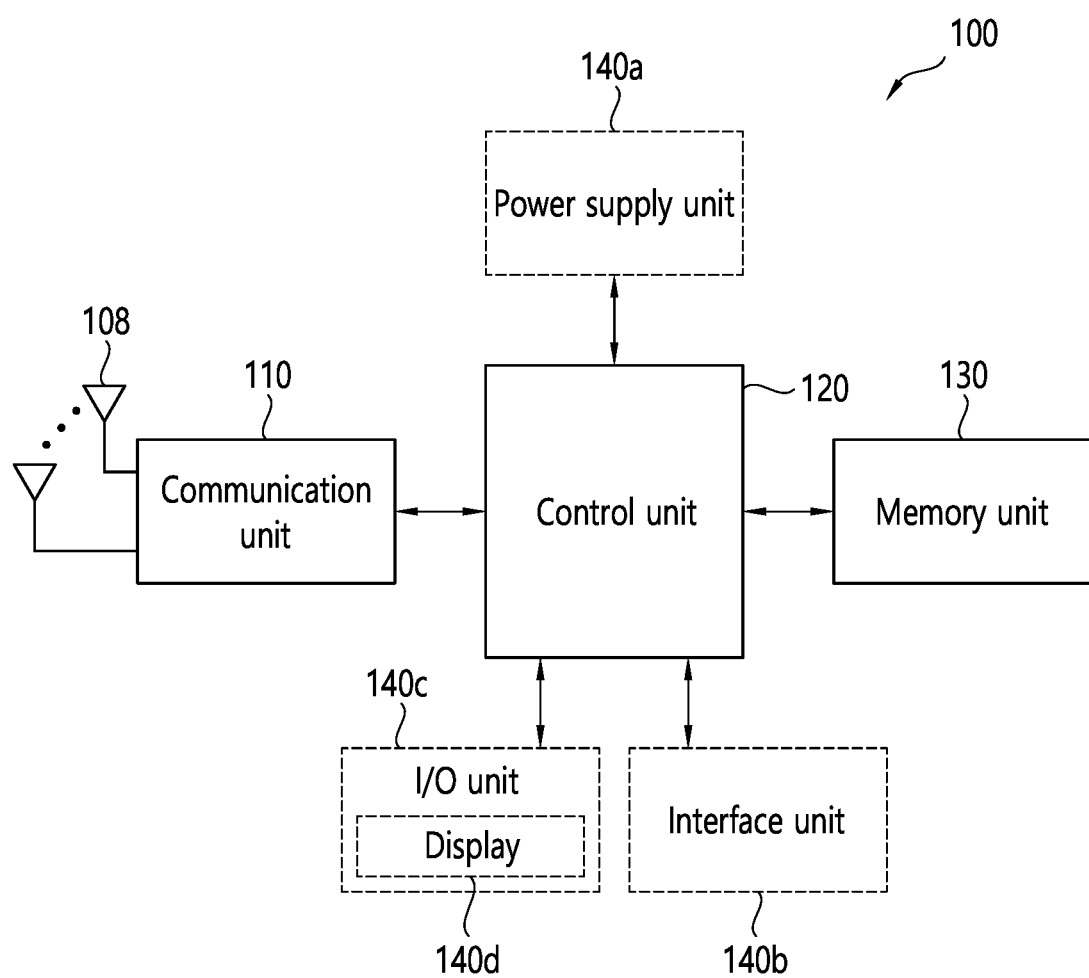
FIG. 21 shows a hand-held device, in accordance with an embodiment of the present disclosure.

FIG. 21 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 22 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    receiving, from a second device through a physical sidelink control channel (PSCCH), first sidelink control information (SCI) for scheduling a physical sidelink shared channel (PSSCH);
    receiving, from the second device through the PSSCH, second SCI and data;
    determining that the second SCI has a first type SCI format among at least a first type SCI format and a second type SCI format;
    wherein the first type of SCI format includes (i) information representing that hybrid automatic repeat request (HARQ) feedback is enabled, (ii) a zone ID, and (iii) a communication range requirement;
    wherein the second type of SCI format includes (i) information representing that HARQ feedback is enabled (ii) a CSI request (iii) a cast type indicator; and
    wherein the HARQ feedback mode is negative-only feedback mode and cast type is groupcast due to the second SCI having the first type SCI format; and
    transmitting, to the second device through a physical sidelink feedback channel (PSFCH), negative acknowledgement (NACK) feedback in response to the PSSCH not being successfully decoded, based on the determined HARQ feedback mode.

2. The method of claim 1,
    wherein a format size budget of the first SCI or a format size budget of the second SCI is pre-configured based on at least one of a cast type or a resource pool, and
    wherein the number of format sizes of the second SCI is determined within the format size budget of the second SCI.

3. The method of claim 1, wherein at least one of a configuration of the second SCI or a size of the second SCI is determined differently based on a value included in the first SCI.

4. The method of claim 1, wherein a plurality of candidate sizes for the second SCI are pre-configured.

5. The method of claim 4, wherein padding bits are added to a selected one of the candidate sizes for the second SCI until it is equal to a size of the first SCI, based on the number of the plurality of candidate sizes exceeding a format size budget of the second SCI.

6. The method of claim 4, wherein padding bits are added until a size of any one selected among the plurality of candidate sizes is equal to the largest candidate size among the plurality of candidate sizes, based on the number of the plurality of candidate sizes exceeding a format size budget of the second SCI.

7. The method of claim 1, wherein transmission of acknowledgment (ACK) feedback is skipped, based on the data being successfully decoded.

8. The method of claim 1, wherein the cast type indicator is 2 bits.

9. The first device of claim 1, wherein the cast type indicator is configured to indicate one of a plurality of cast types and HARQ feedback mode combinations including a first combination of Groupcast and ACK/NACK feedback mode, and a second combination of Groupcast and negative-only acknowledgment (NACK) feedback mode.

10. The first device of claim 1, wherein at least one of a size of the first type of SCI format or a size of the second type of SCI format is determined differently based on a value included in the first SCI.

11. A first device configured to perform wireless communication, the first device comprising:
one or more memories storing instructions;
one or more transceivers; and
one or more processors connected to the one or more memories and the one or more transceivers,
wherein the one or more processors execute the instructions to control the one or more transceivers to:
receive, from a second device through a physical sidelink control channel (PSCCH), first sidelink control information (SCI) for scheduling a physical sidelink shared channel (PSSCH);
receive, from the second device through the PSSCH, second SCI and data;
determine that the second SCI has a first type SCI format among at least a first type SCI format and a second type SCI format;
wherein the first type of SCI format includes (i) information representing that hybrid automatic repeat request (HARQ) feedback is enabled, (ii) a zone ID, and (iii) a communication range requirement;
wherein the second type of SCI format includes (i) information representing that HARQ feedback is enabled (ii) a CSI request (iii) a cast type indicator; and
wherein the HARQ feedback mode is negative-only feedback mode and cast type is groupcast due to the second SCI having the first type SCI format; and
transmit, to the second device through a physical sidelink feedback channel (PSFCH), a negative acknowledgement (NACK) feedback in response to the PSSCH not being successfully decoded, based on the determined HARQ feedback mode.

12. A device configured to control a first user equipment (UE), the device comprising:
one or more processors; and
one or more memories operably connectable to the one or more processors and storing instructions,
wherein the one or more processors execute the instructions to:
receive, from a second UE through a physical sidelink control channel (PSCCH), first sidelink control information (SCI) for scheduling a physical sidelink shared channel (PSSCH);
receive, from the second UE through the PSSCH, second SCI and data;
determine that the second SCI has a first type SCI format among at least a first type SCI format and a second type SCI format;
hybrid automatic repeat request (HARQ) feedback wherein the first type of SCI format includes (i) information representing that hybrid automatic repeat request (HARQ) feedback is enabled, (ii) a zone ID, and (iii) a communication range requirement;
wherein the second type of SCI format includes (i) information representing that HARQ feedback is enabled (ii) a CSI request (iii) a cast type indicator; and
wherein the HARQ feedback mode is negative-only feedback mode and cast type is groupcast due to the second SCI having the first type SCI format; and
transmit, to the second device through a physical sidelink feedback channel (PSFCH), a negative acknowledgement (NACK) feedback in response to the PSSCH not being successfully decoded, based on the determined HARQ feedback mode.

* * * * *